Reissued July 14, 1931

Re. 18,129

UNITED STATES PATENT OFFICE

WILLIAM J. HALE AND EDGAR C. BRITTON, OF MIDLAND, MICHIGAN, ASSIGNORS TO THE DOW CHEMICAL COMPANY, OF MIDLAND, MICHIGAN, A CORPORATION OF MICHIGAN

MANUFACTURE OF PHENOLIC COMPOUNDS

No Drawing. Original No. 1,607,618, dated November 23, 1926, Serial No. 684,907, filed January 7, 1924. Application for reissue filed August 14, 1928. Serial No. 299,641.

As is well known, in the synthetic preparation of those hydroxylic derivatives of benzene and its homologues, classified as phenols, and particularly in such preparation of monohydric phenols, the method in current commercial use is that wherein the salt of the corresponding sulfonic acid is fused with potassium or sodium hydroxide. In other words, the discovery originally reported by A. H. Church (Jour. Chem. Soc. 1, 76; Ann. 128,216) that chloro-benzene is hydrolyzed by caustic potash in aqueous alcoholic solution, despite further experimentation with such processes by Dusart and Bardy (C. r. 74, 1051) and by Meyer and Bergius (Ber. 47, 3155) in aqueous solutions, has apparently resulted in no commercial development of the process involved.

One reason for this failure may be the difficulty, frankly recognized for example in U. S. Patent No. 1,213,142 to J. W. Aylsworth, dated Jan. 23, 1917, that, while the foregoing reaction produces sodium phenate as an end-product, at the same time considerable quantities of diphenyl oxide are formed and such production of diphenyl oxide materially handicaps the commercial application of the process.

We have now discovered that when the diphenyl oxide thus produced is removed from the reaction products and reintroduced into the system, chloro-benzene plus caustic soda, it exercises a marked favorable influence upon the production of phenol itself. As a result, the system is maintained in an approximate state of balance with respect to such diphenyl oxide and the yield of phenol measurably increased. To the accomplishment of the foregoing and related ends, the invention then consists of the steps hereinafter fully described and particularly pointed out in the claims, the following description setting forth but one of the various ways in which the principle of the invention may be used.

The reaction whereby sodium phenate is produced is well understood and may be represented by the following equations:—

(1) $C_6H_5Cl + NaOH = C_6H_5 - OH + NaCl.$ (2) $C_6H_5OH + NaOH = C_6H_5 - ONa + H_2O.$

Incidentally, however, to the foregoing reaction, diphenyl oxide, as above stated, is also formed as represented by the following equation:—

(3) $C_6H_5Cl + C_6H_5 - ONa = C_6H_5OC_6H_5 + NaCl.$

The reaction between the chloro-benzene and caustic soda in aqueous solution is preferably carried out at an elevated temperature, e. g., from 340° to 400° C., and at a correspondingly high pressure. In case the autoclave used is of the tubular type in order to permit the operation to be continuously carried on, the pressure employed on the reacting mixture should be greater than that due to the vapor tension of the reacting substances in order that the passage of the latter through the autoclave may be properly regulated and the operation controlled.

It will be understood that the reactions represented by the equations given above occur simultaneously. Upon completion of the foregoing operation which should not require in excess of one hour, the reaction mixture is removed from the autoclave (continuously in the case of the tubular type of autoclave) and the sodium phenate and diphenyl oxide are thereupon separated from such reaction mixture and are thereupon separated from each other. The sodium phenate, where the desired product is phenol, will then be acidified in the usual manner, while the diphenyl oxide is returned to the mixture that enters into the initial stage of the process. Once the operation has been established, such return is in effect continuously made, and the amount of diphenyl oxide in the reaction mixture is thus at all times maintained at the point where an approximate state of chemical balance with respect to such diphenyl oxide exists.

The formation of more diphenyl oxide from the reacting ingredients is thus repressed to a marked extent; in other words, the amount of diphenyl oxide will not be measurably increased as it thus passes and repasses through the system.

Our improved process is equally applicable to the case where the phenol resulting from the hydrolysis remains present as such (see Equation 1 above), instead of being converted into sodium phenate by the presence of an additional amount of caustic (see Equation 2 above). In other words, a marked advantage results from the maintenance in the system of an equilibrium between the phenol and diphenyl oxide, irrespective of whether the main reaction is one merely of hydrolysis or of hydrolysis and conversion of phenol into phenate.

Where free phenol is the end product, this of course may be separated from the other products of the reaction by distillation; where phenate is the end product the diphenyl oxide may be removed therefrom by steam distillation.

In conclusion it may be noted that the higher the temperature at which the reaction is conducted, the less diphenyl oxide need be returned. As an example, the amount of such diphenyl oxide which we have found it desirable to use is 10 per cent by weight of the chloro-benzene entering into the reaction, where the latter is conducted at a temperature in the neighborhood of 380° C.

Other modes of applying the principle of our invention may be employed instead of the one explained, change being made as regards the method herein disclosed, provided the step or steps taken by any of the following claims or the equivalent of such stated step or steps be employed.

We therefore particularly point out and distinctly claim as our invention:—

1. In a process for the manufacture of a phenolic compound by hydrolyzing a mono-halogenated benzene, wherein diphenyl oxide tends to form along with the desired compound, the step which consists in adding diphenyl oxide to the reaction mixture.

2. In a process for the manufacture of a phenolic compound by hydrolyzing a mono-halogenated benzene, wherein diphenyl oxide tends to form along with the desired compound, the step which consists in adding diphenyl oxide to the reaction mixture in an amount sufficient to maintain the system in an approximate state of chemical balance with respect to such diphenyl oxide, whereby the formation of any substantial additional amount of such diphenyl oxide is prevented.

3. In a process for the manufacture of a phenolic compound, by hydrolyzing a mono-halogenated benzene, wherein diphenyl oxide tends to form along with the desired compound, the steps which consist in removing and separating such diphenyl oxide and phenol, and returning such diphenyl oxide to the first step.

4. In a process for the manufacture of a phenolic compound, by hydrolyzing a mono-halogenated benzene by a caustic alkali solution with production of an alkali metal phenate and some diphenyl oxide, the step which consists in restraining the formation of such last-mentioned compound by initially adding same to the reaction mixture.

5. In a process for the manufacture of a phenolic compound, by hydrolyzing a mono-halogenated benzene by a caustic alkali solution with production of an alkali metal phenate and some diphenyl oxide, the step which consists in initially adding diphenyl oxide to the reaction mixture in an amount sufficient to maintain the system in an approximate state of chemical balance with respect to such compound, whereby the formation of any substantial additional amount of such diphenyl oxide is prevented.

6. In a process for the manufacture of a phenolic compound, by hydrolyzing a mono-halogenated benzene by a caustic alkali solution with production of an alkali metal phenate and some diphenyl oxide, the steps which consist in removing and separating such phenate and diphenyl oxide, and returning the latter to the first step.

7. In a process for the manufacture of a phenolic compound, the steps which consist in hydrolyzing a mono-halogenated benzene by a caustic alkali solution at a temperature of from 340° to 400° C. and under a pressure greater than the vapor tension of the reacting substances, whereby an alkali metal phenate is formed together with some diphenyl oxide, and restraining the formation of such last-mentioned compound by initially adding same to the reaction mixture.

8. In a process for the manufacture of a phenolic compound, the steps which consist in mixing a mono-halogenated benzene with caustic alkali solution, causing the mixture to traverse a path wherein it is subject to a temperature of from 340° to 400° C., and under a pressure greater than the vapor tension of the reacting substances, whereby an alkali metal phenate is formed along with some diphenyl oxide, and restraining the formation of such last-mentioned compound by initially adding same to the reaction mixture.

9. In a process for the manufacture of a phenolic compound, the steps which consist in mixing a mono-halogenated benzene with caustic alkali solution causing the mixture to traverse a path wherein it is subject to a temperature of from 340° to 400° C. and under a pressure greater than the vapor tension of the reacting substances, whereby an alkali metal phenate is formed along with some diphenyl oxide, removing and separating such phenate and diphenyl oxide, and returning the latter to the first step.

10. In a process for the manufacture of a phenolic compound, the steps which consist in mixing a mono-halogenated benzene with caustic alkali, continuously causing the mixture to traverse a path wherein it is subject to a temperature of from 340° to 400° C. and under a pressure greater than the vapor tension of the reacting substances, whereby an alkali metal phenate is formed along with some diphenyl oxide, removing and separating such phenate and diphenyl oxide, and returning the latter to the first step.

11. A process for the manufacture of phenolic compounds, which comprises hydrolyzing a nuclear monohalogenated aromatic hydrocarbon of the benzene series and limiting diaryl oxide formation by adding the corresponding diaryl oxide.

12. A process for the manufacture of phenolic compounds, which comprises hydrolyzing a nuclear monohalogenated aromatic hydrocarbon of the benzene series and limiting diaryl oxide formation by adding the corresponding diaryl oxide in amount sufficient to maintain the system in an approximate state of chemical balance with respect to such oxide.

13. A process for the manufacture of phenolic compounds which comprises hydrolyzing a nuclear monohalogenated aromatic hydrocarbon of the benzene series, removing the resulting phenolic compound and corresponding diaryl oxide from the reaction product, separating the two and returning such oxide to the initial reaction, whereby the further formation thereof is restrained.

14. A process for the manufacture of phenolic compounds which comprises hydrolyzing a nuclear monohalogenated aromatic hydrocarbon of the benzene series by heating under pressure with an aqueous alkaline solution, separating the diaryl oxide formed from the aqueous phenate solution and returning such oxide to the initial reaction, whereby the further formation thereof is restrained.

15. A process for the manufacture of phenolic compounds, which comprises hydrolyzing a nuclear monohalogenated aromatic hydrocarbon of the benzene series by an aqueous alkaline solution, and restraining the formation of diaryl oxide by initially adding same to the reaction mixture.

16. A process for the manufacture of phenolic compounds which comprises heating a nuclear monohalogenated aromatic hydrocarbon of the benzene series under pressure at a temperature between approximately 340° and 400° with an aqueous sodium hydroxide solution, separating the corresponding diaryl oxide from the reaction product and returning the same to the first step.

Signed by us this 9th day of August, 1928.

WILLIAM J. HALE.
EDGAR C. BRITTON.